(12) United States Patent
Cavarero et al.

(10) Patent No.: US 11,453,472 B2
(45) Date of Patent: Sep. 27, 2022

(54) CABIN MODULE WITH INTEGRATED DRAINAGE AND AIRCRAFT WITH A CABIN MODULE

(71) Applicant: Airbus Operations GmbH, Hamburg (DE)

(72) Inventors: Paolo Cavarero, Hamburg (DE); Michael Mosler, Hamburg (DE); Martin Hentschel, Hamburg (DE)

(73) Assignee: AIRBUS OPERATIONS GMBH, Hamburg (DE)

( * ) Notice: Subject to any disclaimer, the term of this patent is extended or adjusted under 35 U.S.C. 154(b) by 238 days.

(21) Appl. No.: 16/688,058

(22) Filed: Nov. 19, 2019

(65) Prior Publication Data
US 2020/0156755 A1 May 21, 2020

(30) Foreign Application Priority Data

Nov. 20, 2018 (DE) .......................... 102018129183.3

(51) Int. Cl.
*B64D 11/00* (2006.01)
*B64C 1/06* (2006.01)

(52) U.S. Cl.
CPC ............ *B64C 1/067* (2013.01); *B64D 11/003* (2013.01); *B64D 2011/0046* (2013.01)

(58) Field of Classification Search
CPC .. B64D 11/003; B64D 2011/004; B64C 1/067
See application file for complete search history.

(56) References Cited

U.S. PATENT DOCUMENTS

| 4,641,464 | A | * | 2/1987 | Andersson | .............. | E04D 13/08 52/16 |
| 4,862,651 | A | * | 9/1989 | Walker | .................... | E04D 13/08 52/16 |
| 5,083,727 | A | * | 1/1992 | Pompei | .................. | B64D 11/04 244/118.6 |
| 5,090,639 | A | | 2/1992 | Miller et al. | | |
| 2010/0044512 | A1 | * | 2/2010 | Paul | ........................ | B64C 1/067 244/129.1 |
| 2011/0253836 | A1 | * | 10/2011 | Hashberger | ............ | B64D 13/00 244/118.5 |
| 2012/0074258 | A1 | * | 3/2012 | Papke | ..................... | B64C 1/066 244/118.5 |
| 2018/0010525 | A1 | | 1/2018 | Madge | | |
| 2018/0105251 | A1 | * | 4/2018 | Hitchcock | ............... | B64C 1/067 |

(Continued)

FOREIGN PATENT DOCUMENTS

CA 3014445 A1 * 4/2019 ............. B64C 1/067

OTHER PUBLICATIONS

German Search Report; priority document.
(Continued)

*Primary Examiner* — Timothy D Collins
*Assistant Examiner* — Justin Michael Heston
(74) *Attorney, Agent, or Firm* — Greer, Burns & Crain, Ltd.

(57) ABSTRACT

A cabin module for an aircraft comprises a section which has an upward-facing surface in an installed state of the cabin module, wherein the upward-facing surface of the section comprises an integrated drainage channel. An aircraft furthermore comprises at least one such cabin module.

12 Claims, 3 Drawing Sheets

(56) References Cited

U.S. PATENT DOCUMENTS

2018/0105252 A1    4/2018  Hitchcock et al.
2018/0305027 A1*  10/2018  McIntosh ............... B29C 63/40

OTHER PUBLICATIONS

Bostanze Brinkschulte, "Wasser im Kuhlschrank: Woran liegt das und was kann ict tun?," https://www.liebenswertmagazin.de/wasser-im-kuehlschrank-woran-liegt-das-und-was-kann-ich-tun-4573.html, Oct. 28, 2019.
Peter Hagen, "Kuhlschrank als Brandursache wie in Saalburg sonst kaum besonderer Gefahrenherd," https://www.otz.de/leben/vermischtes.kuehlschrank-als-brandursache-wie-in-saalburg-sonst-kaum-besonderer-gefahrenherd-id219861671.html, Oct. 28, 2019.
French Examination Report for corresponding French Patent Application No. 1912683 dated Aug. 3, 2021.

* cited by examiner

FIG 5  V-V
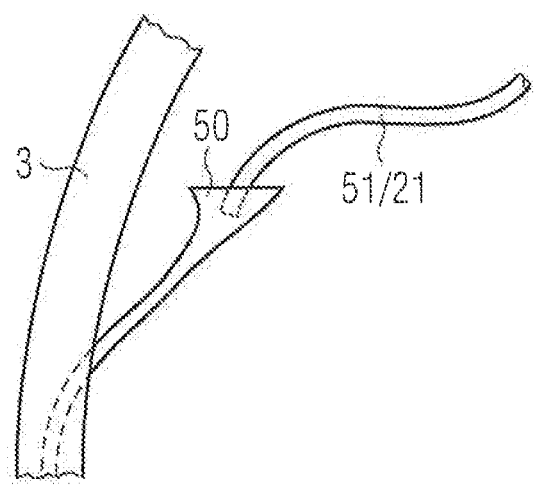
FIG 6
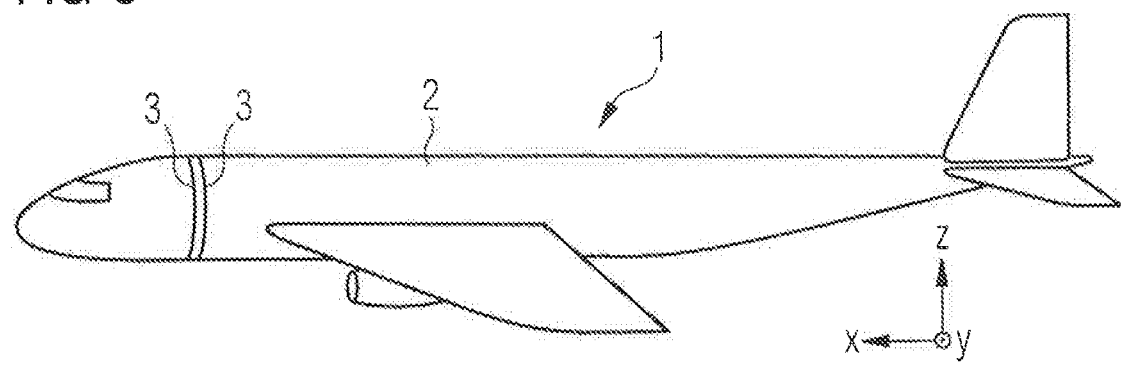

CABIN MODULE WITH INTEGRATED DRAINAGE AND AIRCRAFT WITH A CABIN MODULE

CROSS-REFERENCES TO RELATED APPLICATIONS

This application claims the benefit of the German patent application No. 102018129183.3 filed on Nov. 20, 2018, the entire disclosures of which are incorporated herein by way of reference.

FIELD OF THE INVENTION

The invention relates to a cabin module having an integrated drainage channel and to an aircraft having a cabin module of this kind.

BACKGROUND OF THE INVENTION

In aircraft, condensate may easily form in the vicinity of the outer skin of the aircraft. Condensate may form and collect particularly in regions between a cabin module and the outer skin of the aircraft and at components which are connected to the outer skin and are not thermally insulated. Since the cross-sectional contour of the aircraft fuselage, and therefore generally also of the adjacent cabin module, extends obliquely to a horizontal or a vertical plane, attempts are made to collect and drain off the condensate without allowing it to reach the passenger area of the aircraft cabin.

Thus, for example, felt strips or mats are attached to the outer side of a luggage bin which faces the outer skin of the aircraft. Felt strips are attached to the upper and the rear outer side of the luggage bin along an upper edge (parallel to a longitudinal direction of the luggage bin or X axis of the aircraft) and along lateral edges (perpendicular to the longitudinal direction of the luggage bin or parallel to the Y axis of the aircraft), for example. These can absorb condensate and release it at a later time, e.g., when the aircraft is on the ground.

SUMMARY OF THE INVENTION

It is an underlying object of the invention to provide a cabin module which allows efficient drainage of condensate and has a simple construction. It is furthermore the underlying object of the invention to specify an aircraft that has a cabin module of this kind.

A cabin module for an aircraft comprises a section which has an upward-facing surface in an installed state of the cabin module. An upward-facing surface forms an outer side of the cabin module which faces the aircraft fuselage and, in particular, an outer skin of the aircraft. Upward-facing means that condensate can drip or flow onto the outer side of the section of the cabin module in the installed state of the cabin module and that condensate can stand on or run along at least the outer side of the section of the cabin module. In other words, a line perpendicular to the outer side of the section of the cabin module points in the direction of the positive Z axis (in the direction of a vertical). In this case, the section of the cabin module can be arranged perpendicular to the Z axis, i.e., parallel to the X axis and/or Y axis (parallel to a horizontal).

In one embodiment, the section of the cabin module forms a level plane. As an alternative or at least in part, the section of the cabin module can also have a curvature.

In an alternative or additional embodiment, the section of the cabin module has a surface facing obliquely upwards. The oblique orientation can be regarded as relative to a horizontal plane or a vertical plane. In other words, the section of the cabin module is at an angle of between 0 and 90° to the horizontal (Y axis of the aircraft) and to the vertical (Z axis of the aircraft) in a state in which it is installed in the aircraft and viewed in a cross section of the aircraft.

Furthermore, the (obliquely) upward-facing surface of the section can comprise an integrated drainage channel Here, integrated means that the drainage channel is formed in and/or on the material of the section of the cabin module, and therefore the drainage channel does not form an independent component. Of course, it is also possible for a multiplicity of drainage channels to be integrated into and/or onto the upward-facing surface of the section.

An integrated drainage channel allows easier installation of the cabin module in an aircraft since the time-consuming attachment of felt strips or felt mats is eliminated. It is also possible to eliminate the weight of the felt strips or mats. An additional weight saving can also be achieved if the condensate is discharged from the aircraft and therefore there is no need to transport any condensate in the felt strips or felt mats during the flight.

In a variant embodiment, the drainage channel (or each of the drainage channels) can be in the form of a depression in the surface of the cabin module section. As an alternative or in addition, the drainage channel (or each of the drainage channels) can be in the form of a raised area on the surface of the cabin module section. The raised area, e.g., a projecting rib, is suitable particularly in the case of cabin modules with thin walls.

The drainage channel is provided, in particular, on the outer side of the cabin module, i.e., the outer side of the cabin module which faces the aircraft fuselage (in particular, the outer skin of the aircraft), thus enabling condensate formed in this region to run along the outer side of the cabin module and collect in the drainage channel. This allows reliable collection and draining away of condensate without additional components, e.g., felt strips. The cabin module can furthermore be produced more quickly and economically since there is no need to attach an additional component in the form of a felt strip or drainage channel.

The depression and/or raised area can have a triangular, rectangular or curved cross section, for example. In each case, the depression has a point which is lower (relative to the horizontal) than an imaginary continuous surface of the section of the cabin module. In other words, the depression has at least one point in cross section—in relation to the installed state of the cabin module—which is lower than an imaginary continuous outer side of the cabin module section without the depression. A raised area rises above the imaginary continuous surface of the section of the cabin module, with the result that condensate flowing on the upward-facing surface of the section of the cabin module is collected by the raised area and flows onward along the raised area (in the drainage channel).

In a variant embodiment, at least the section of the cabin module can be formed from a plastically deformable plastic. In this case, the section of the cabin module can be formed from a plastic which can be molded before curing of the plastic and is no longer deformable under normal temperature and pressure conditions after the curing of the plastic or, alternatively, can be formed from a plastic which is plastically deformable even after curing (production of the plastic), e.g., owing to the effect of a higher temperature or of an increased pressure on the plastic.

In another variant embodiment, the section of the cabin module can have a sandwich structure. During the production of the sandwich structure, a surface structure which comprises the drainage channel (depression and/or raised area) in/on the surface can be imparted to the structure by means of a corresponding molding die or a corresponding mold. As an alternative, the sandwich structure can initially be adapted to the external shape of the section of the cabin module and then the drainage channel (depression and/or raised area) can be introduced/applied into/to the surface of the cabin module section by means of an appropriate molding die. A molding die which has the inverse shape of the drainage channel can be pressed against the surface of the cabin module section while the surface of the cabin module section is (still) deformable, for example.

In another variant embodiment, the section of the cabin module can be produced from a fiber-reinforced plastic. To form the cabin module section, a "pre-preg" (semifinished product) can be placed on a molding die or molding element on which the inverse shape of the drainage channel is disposed. By applying heat and pressure, the cabin module section can be cured, wherein the drainage channel is integrated into/onto the surface of the cabin module section.

As an alternative, it is also possible for the drainage channel to be produced by removing material from the section of the cabin module (depression) and/or by applying material to the section of the cabin module. For example, the drainage channel can be produced in the surface of the outer side of the cabin module by means of a milling cutter (depression) and/or can be produced by spraying a material that bonds with the material of the cabin module onto the surface of the outer side of the cabin module (raised area)—(a raised area can be integrated well into the surface, particularly in the case of injection molding methods and methods based on resin mats). Depending on the material of the cabin module, the surface of the cabin module section must furthermore be made watertight, e.g., by applying a water-impermeable layer. It is thereby also possible to convert existing cabin modules.

In an alternative or additional variant embodiment, the drainage channel is arranged in/on the section of the cabin module in such a way that the drainage channel has a slope in an installed state of the cabin module and ends at an outlet point. The outlet point thus forms the lowest point of the slope of the drainage channel. In this case, the drainage channel can have a linear profile or, alternatively, can also have a curved profile, wherein each point of the drainage channel up to the outlet point has a slope. In the case of a cabin module, the section of which with the drainage channel is arranged horizontally in the installed state, the depth/height of the drainage channel may also vary, with the result that the differing depth/height of the drainage channel produces a slope via which the water can flow away.

In another variant embodiment, the (obliquely) upward-facing surface of the section comprises two drainage channels. In this case, each of the drainage channels can extend from a common highest point to respective outlet points, wherein each of the outlet points is situated on one side of the cabin module. As an alternative, each of the drainage channels can extend from a respective highest point to a common outlet point. This common outlet point can be situated centrally between two sides of the cabin module or, alternatively, can be arranged offset from the center (asymmetrically).

The drainage channel (depression and/or raised area) can be dimensioned in such a way that it can (still) just carry away the condensate which is assumed will form. Thus, the drainage channel/depression/raised area can have a width of between 3 and 15 mm, preferably between 3 and 10 mm and particularly preferably a width of 5 mm A selected depth of the drainage channel/depression/raised area can be between 3 and 5 mm, preferably between 3 and 10 mm and particularly preferably 5 mm.

In another variant embodiment, the section of the cabin module can have a plurality of drainage channels extending adjacent to one another. The drainage channels can extend parallel and spaced apart with respect to one another, for example. This makes it possible to keep the width and/or depth of the drainage channel small since the drainage channel has only to receive and carry away condensate from the surface between the drainage channel and the adjacent drainage channel situated thereabove.

In another variant embodiment, the drainage channel opens into an outflow funnel. For this purpose, the drainage channel can have a section which rises from or extends away from the rest of the surface of the section of the cabin module and leads to the outflow funnel. This section of the drainage channel can likewise be integrated into the cabin module, that is to say, is produced integrally with the remaining section of the cabin module. As an alternative, it is also possible for the section of the cabin module to be shaped in such a way that there is an overhang at the outlet point of the drainage channel, thus enabling the drainage channel to be arranged above or in the outflow funnel at the outlet point when the cabin module is installed in the aircraft.

As an alternative or in addition, the drainage channel can open into an outflow hose or an outflow tube. The outflow hose or the outflow tube can be arranged at the outlet point of the drainage channel, for example. For this purpose, the outflow hose or the outflow tube can likewise be integrated into the cabin module or can be secured as a separate component on the cabin module at the outlet point (being adhesively bonded, welded or secured in some other watertight manner, for example). In one illustrative embodiment, the outflow hose or the outflow tube opens into an outflow funnel.

This makes it possible to fit an outflow funnel in a first completion stage of the aircraft, e.g., during the attachment of insulation, pipes and other elements to an outer skin of the aircraft. In this case, the outflow funnel can already be arranged at a point on the aircraft fuselage which corresponds to the subsequent position of the outlet point of the drainage channel and/or of the outflow hose. All that is then necessary is to secure the cabin module on the aircraft fuselage, thereby producing a fluid connection of the drainage channel to the outflow funnel. The outflow funnel itself can be connected to a water collecting system of the aircraft, wherein the collected water is either (re-)used in the aircraft or discharged from the aircraft.

In various variant embodiments, the cabin module can be a luggage bin, a ceiling panel and/or a side wall panel. The luggage bin can be a luggage bin which is arranged above passenger seats. As an alternative or in addition, it can be a luggage bin or some other storage compartment which is situated in the upper region of a monument (galley, toilet, cupboard, etc.). A ceiling panel or side wall panel can be arranged at any point in the aircraft, e.g., above windows, aircraft doors, emergency exits, etc.

In another variant embodiment, a luggage bin can have a top wall which delimits the luggage bin at the top and comprises the section. The luggage bin can furthermore have at least one side wall laterally delimiting the luggage bin and a drainage profile arranged on the side wall. The drainage profile arranged on the side wall serves to collect condensate between two cabin modules, in this case luggage bins Finally, the luggage bin can also have a front flap which is designed to close an opening of the luggage bin.

The drainage profile can be integrated into and/or onto the side wall, i.e. can be produced integrally with the side wall. The drainage profile has a trough-shaped cross section. The drainage profile can have a U-shaped, J-shaped, triangular, semicircular or similar cross section, for example.

As an alternative or in addition, the drainage profile arranged in/on the side wall can open into an outflow funnel or into an outflow hose. This can be a separate outflow funnel or outflow hose. As an alternative, it is also possible to use the same outflow funnel or outflow hose which receives water from a drainage channel. It is thus possible to collect condensate in a weight saving manner both from the section of the cabin module and from the space between two cabin modules.

In another variant embodiment, the cabin module can furthermore comprise a felt strip arranged on the side wall of the luggage bin above the drainage profile. This allows the collection of condensate from a space between the outer skin of the aircraft or other primary structure of the aircraft and two adjacent cabin modules and, at same time, the sealing of this space with respect to a passenger cabin. For example, the felt strip can prevent condensate escaping into the passenger cabin between two adjacent cabin modules.

Furthermore, an aircraft comprises at least one cabin module according to one of the embodiments described.

Furthermore, the section of the cabin module can extend substantially parallel to an outer skin of the aircraft. In other words, the cabin module is manufactured and arranged (and secured) in the aircraft in such a way that the section of the cabin module extends parallel to the outer skin of the aircraft. This makes possible a uniformly dimensioned space between the outer skin of the aircraft and the cabin module.

BRIEF DESCRIPTION OF THE DRAWINGS

Preferred embodiments of the invention are now explained in greater detail with reference to the appended schematic drawing, in which FIG. 5 shows a side view of an outflow funnel from the detail V-V in FIG. 3 schematically, and FIG. 6 shows an aircraft.

DETAILED DESCRIPTION OF THE PREFERRED EMBODIMENTS

Figure 1:
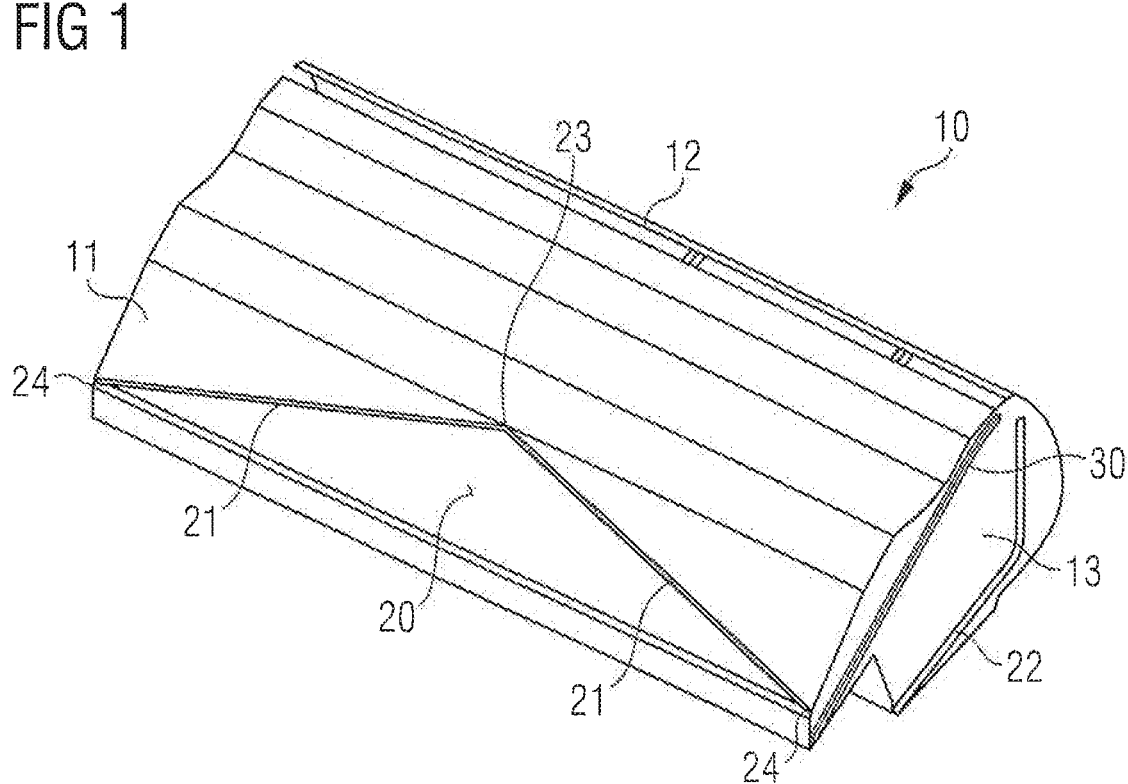
FIG. 1 shows a cabin module in the form of a luggage bin schematically and in perspective.

A cabin module 10 illustrated in FIG. 1 has a section 11 which has an upward-facing surface 20 in an installed state of the cabin module 10 in an aircraft 1 (FIG. 6). A luggage bin 10 is illustrated by way of example in FIG. 1, wherein a top wall delimiting the luggage bin at the top forms the section 11 of the cabin module. The luggage bin furthermore has a front flap 12 which is designed to close an opening of the luggage bin 10. Finally, laterally delimiting side walls 13 and a base (not illustrated) of the luggage bin 10 are provided.

The section 11 of the cabin module 10 can likewise be part of a ceiling panel or a side wall panel of an interior lining of the aircraft 1. As an alternative or in addition, the section 11 of the cabin module 10 can also be part of a storage compartment in an aircraft monument (not shown).

Figure 2:
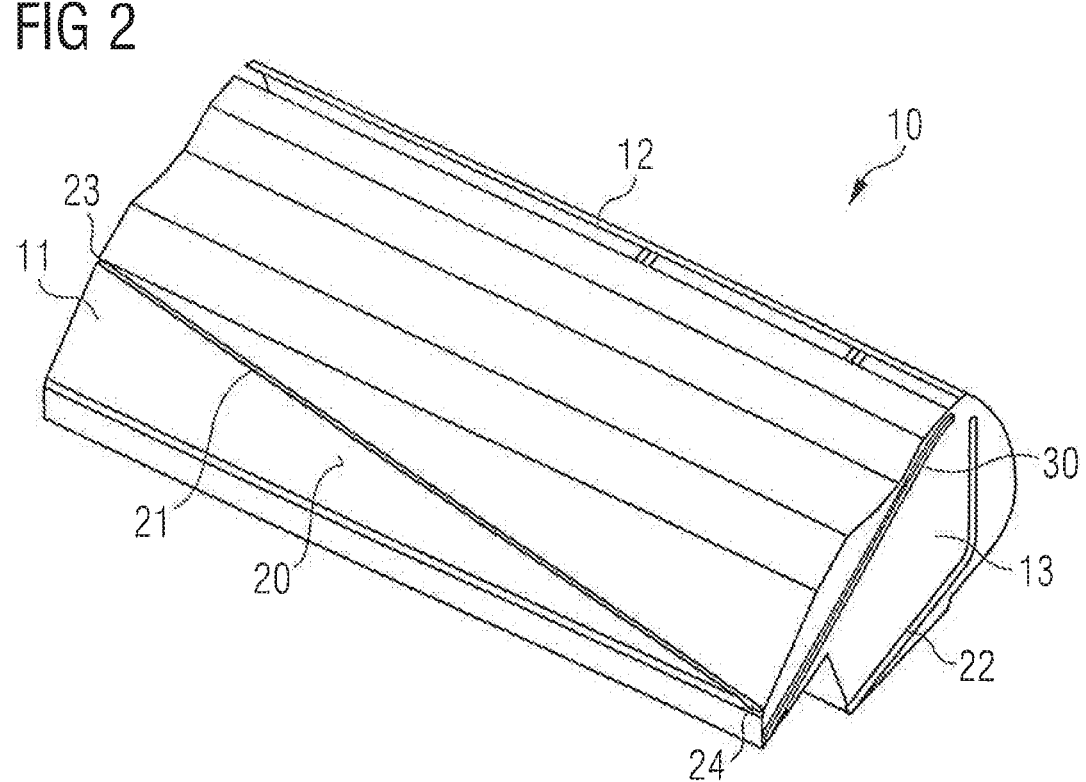
FIG. 2 shows a cabin module in the form of a luggage bin with a different configuration of a drainage channel schematically and in perspective.

The upward-facing surface 20 of the section 11 of the cabin module 10 comprises a drainage channel 21. As shown in FIG. 1, the drainage channel 21 is arranged in and/or on the cabin module section 11 in such a way that the drainage channel 21 has a slope in an installed state of the cabin module 10. In this case, the upward-facing surface 20 of the cabin module section 11 can comprise a plurality of drainage channels 21 (e.g., two drainage channels 21), as illustrated in FIG. 1. In another variant embodiment, as shown in FIG. 2, the cabin module section 11 can have a single drainage channel 21.

Each of the drainage channels 21 extends from a highest point 23 to an outlet point 24, wherein a slope is formed between the highest point 23 and the outlet point 24. As a result, condensate which collects above the drainage channel on the surface 20 of the cabin module section 11 can flow into the drainage channel 21 (or can be collected thereby) and can flow to the outlet point 24 by virtue of the slope. In the variant embodiment illustrated in FIG. 1, the drainage channels 21 have a common highest point 23 and in each case one outlet point 24 on one side 13 of the cabin module 10. Of course, the drainage channels 21 can also have a reverse slope (not illustrated), wherein each of the drainage channels 21 has a highest point on one side 13 of the cabin module 10 and both drainage channels 21 have a common outlet point 24. It is likewise possible too for a plurality of drainage channels 21 to be arranged adjacent to one another on the surface 20 of the cabin module section 11 (likewise not illustrated).

Figure 3:
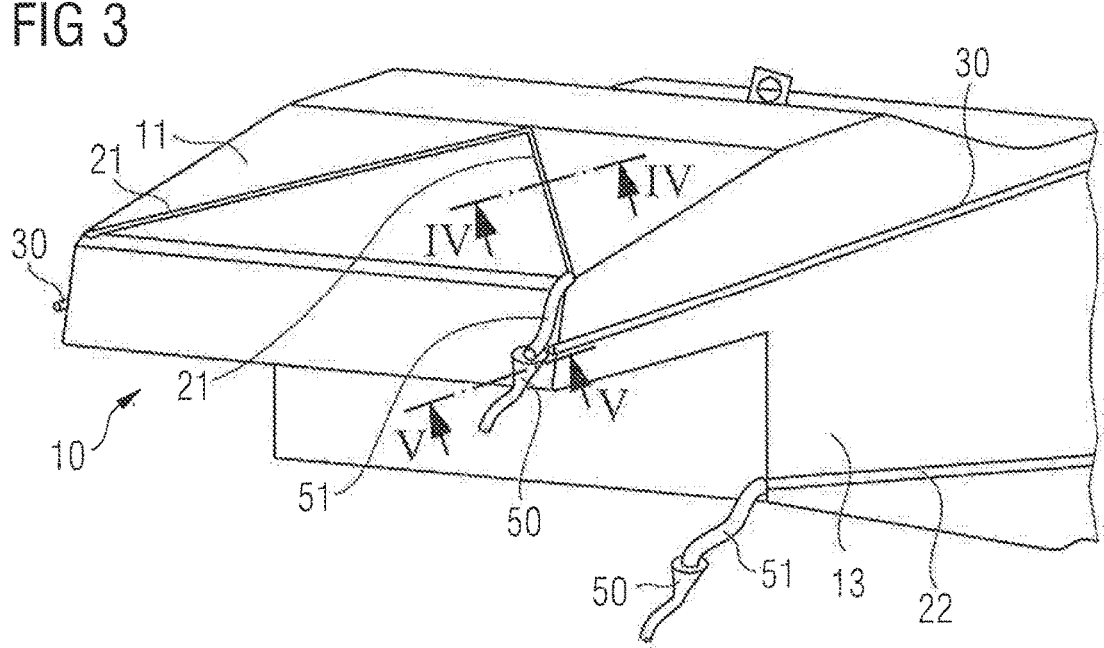
FIG. 3 shows another view of the cabin module from FIG. 1 schematically and in perspective.

FIG. 3 shows a different view of the cabin module 10 from FIG. 1. In this figure, an outflow funnel 50 and an optional outflow hose 51 are illustrated in addition. The outflow funnel 50 can be secured on a primary structure of the aircraft 1 (the aircraft fuselage), and therefore the outlet point 24 of a drainage channel 21 or an outlet hose 51 connected to the outlet point 24 can be arranged above and/or in the outflow funnel 50 when the cabin module 10 is installed. Water collected in the drainage channel 21 can thereby be discharged via the outflow funnel 50 without the need to provide additional water-carrying elements after the installation of the cabin module 10.

The cabin module 10 can furthermore have a drainage profile 22 arranged on one side or side wall 13 of the cabin module 10. This drainage profile 22 makes it possible to drain off condensate between two cabin modules 10. The drainage profile 22 can likewise open into an outflow funnel 50 or into an outflow hose 51, wherein this can be a separate outflow funnel 50 or the same outflow funnel 50 to which the drainage channel 21 is connected.

In addition to or instead of the drainage profile 22, a fabric can be arranged between two adjacent cabin modules 10. For example, a fabric strip 30 in the form of a felt strip 30 can be arranged between two adjacent cabin modules 10. This serves to provide sealing between the cabin modules 10 and additionally to absorb condensate. In one embodiment, one end of the felt strip 30 can enter the same outflow funnel 50 as a drainage channel 21. Thus, condensate which is moving in the direction of the outflow funnel 50 in the felt strip 30 and cannot be discharged in the meantime by evaporation can also flow off there, e.g., if the possible saturation of the felt strip 30 is exceeded.

Figure 4A:
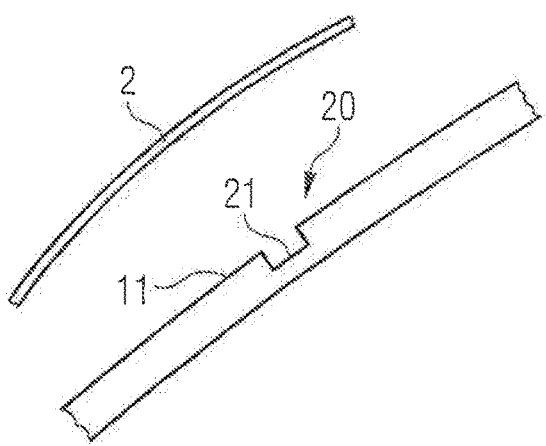
FIGS. 4A, 4B and 4C show various cross sections of a drainage channel of a section of a cabin module along section line IV-IV in FIG. 3 schematically.
Figure 4B:
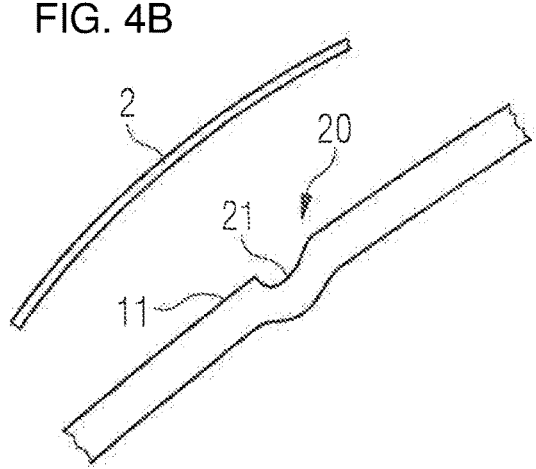
Figure 4C:
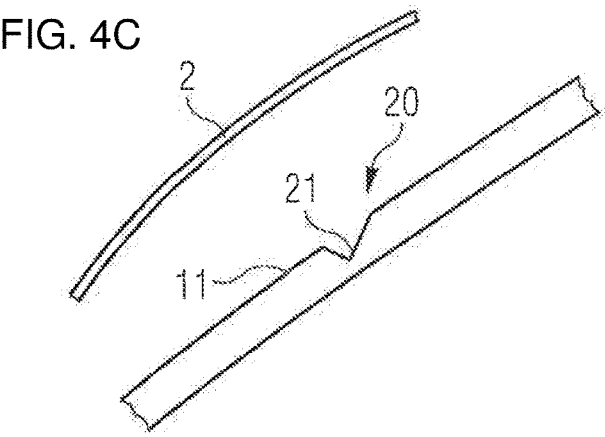

FIGS. 4A-4C show various cross sections of a drainage channel 21 of a section 11 of a cabin module 10 along section line IV-IV in FIG. 3 schematically.

The section 11 of the cabin module 10 is distinguished by the fact that it extends substantially parallel to an outer skin 2 of the aircraft 1. Here, substantially parallel means that the section 11 of the cabin module 10 extends either precisely parallel to the outer skin or at least has an orientation which is similar to the curvature of the outer skin 2 of the aircraft 1. Thus, the section 11 of the cabin module 10 can form a level plane which is arranged obliquely to match the outer skin 2 of the aircraft 1, as shown in FIG. 4A. It is, of course, also possible for the section 11 of the cabin module 10 to have a curved surface 20, wherein this surface can optionally be arranged parallel to (concentrically with) the outer skin 2 of the aircraft 1 in the installed state of the cabin module 10.

By way of example, the drainage channel 21 is shown in the form of a depression in the surface 20 in FIG. 4. The drainage channel 21 is thus integrated into the upward-facing surface 20 of the cabin module section 11. It is also possible for the drainage channel to be formed as a raised area (in the longitudinal direction of the drainage channel), at least in some section or sections (not illustrated). The raised area can be formed from the material of the surface 20, with the result that the raised area is also integrated into the upward-facing surface 20 of the cabin module section 11. The depression or raised area (the drainage channel 21) can have a rectangular cross section (FIG. 4A), a curved cross section (FIG. 4B) or a triangular cross section (FIG. 4C). It is, of course, also possible for the drainage channel 21 to have some other cross section (e.g., polygonal or S-shaped with a depression and a raised area) or to have a shape composed of the illustrated cross sections. In each case, the depression 21 has a point which is lower than an imaginary continuous surface 20 of the cabin module section 11 in the installed state of the cabin module 10, and the raised area has a point which is above (higher than) an imaginary continuous surface 20 of the cabin module section 11 in the installed state of the cabin module 10.

To produce the drainage channel 21, the channel can be integrated into the surface 20 of the cabin module section 11 by appropriate shaping of the surface during the production of the section 11 of the cabin module 10. Thus, the drainage channel 21 can be formed independently of an inner surface (situated opposite the outer surface 20) of the cabin module 10, as illustrated schematically in FIGS. 4A and 4C. As an alternative, it is also possible for the drainage channel 21 to be introduced subsequently into the cabin module section 11, e.g., by the action of heat and pressure. During this process, the inner surface of the cabin module 10 may also be deformed, as illustrated schematically in FIG. 4B. A raised area that is the reverse of the one illustrated in FIG. 4B can be formed in the same way from the inside outwards.

FIG. 5 shows a side view of an outflow funnel 50 from the detail V-V in FIG. 3 schematically. Here, the outflow funnel 50 can be arranged on a structural component 3 of the aircraft fuselage, which is illustrated as a frame 3 in FIG. 5 by way of example. When the cabin module 10 is installed and secured on the aircraft fuselage, the outlet point 24 of the drainage channel 21 and/or an outflow hose 51 can open into the outflow funnel 50, as shown schematically in FIG. 5. It is thereby possible to produce a simple and rapid connection of the drainage channel 21 to a water drainage system.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A cabin module for an aircraft comprising:
   a section which has an upward-facing surface in an installed state of the cabin module,
      the upward-facing surface of the section comprising an integrated drainage channel having a lengthwise opening configured to collect condensation formed above the integrated drainage channel,
   wherein the cabin module is a luggage bin, wherein the luggage bin comprises:
      a top wall, which delimits the luggage bin at the top and comprises the section,
      a front flap which is designed to close an opening of the luggage bin,
      at least one side wall laterally delimiting the luggage bin, and
      a drainage profile arranged on the side wall.

2. The cabin module according to claim 1, wherein the drainage channel is formed as at least one of a depression in the surface or a raised area in the surface.

3. The cabin module according to claim 2, wherein the at least one of the depression or the raised area has a triangular, rectangular or curved cross section.

4. The cabin module according to claim 1, wherein the section is formed from a plastically deformable plastic.

5. The cabin module according to claim 1, wherein the drainage channel is arranged in the section such that the drainage channel has a slope in an installed state of the cabin module and ends at an outlet point.

6. The cabin module according to claim 1,
   wherein the upward-facing surface of the section comprises two drainage channels,
   wherein each of the drainage channels extends from a common highest point to respective outlet points,
   wherein each of the outlet points is situated on one side of the cabin module.

7. The cabin module according to claim 1, wherein the drainage channel opens into an outflow funnel or into an outflow hose.

8. The cabin module according to claim 7, wherein the outflow hose opens into an outflow funnel.

9. The cabin module according to claim 1, wherein the drainage profile opens into an outflow funnel or into an outflow hose.

10. The cabin module according to claim 1, further comprising:
   a felt strip, which is arranged on the side wall of the luggage bin, above the drainage profile.

11. An aircraft having at least one cabin module according to claim 1.

12. The aircraft according to claim 11, wherein the section of the cabin module extends substantially parallel to an outer skin of the aircraft.

\* \* \* \* \*